March 12, 1935.  J. MOTYCKA  1,993,892
MEASURING DEVICE FOR PANTOGRAPH ENGRAVING MACHINES
Filed Jan. 22, 1934
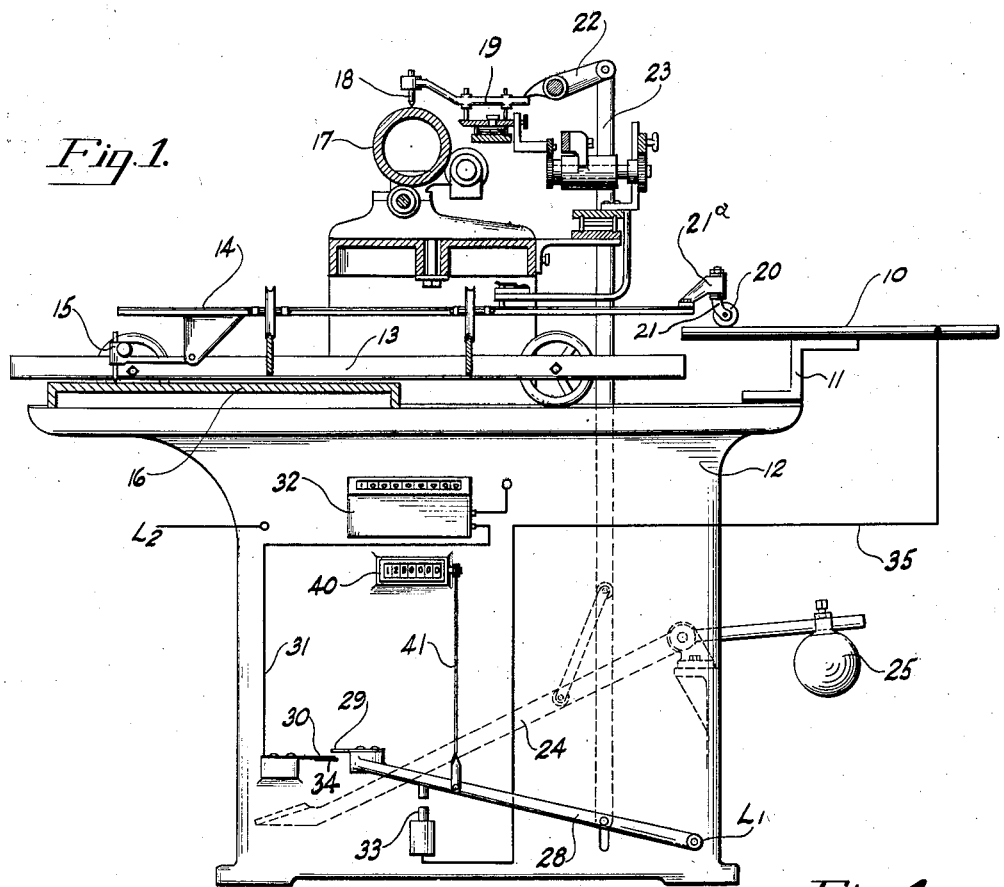
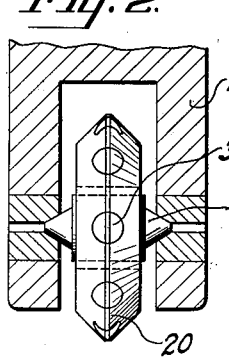
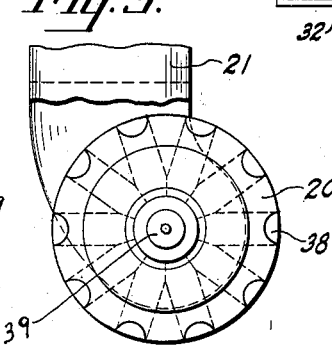
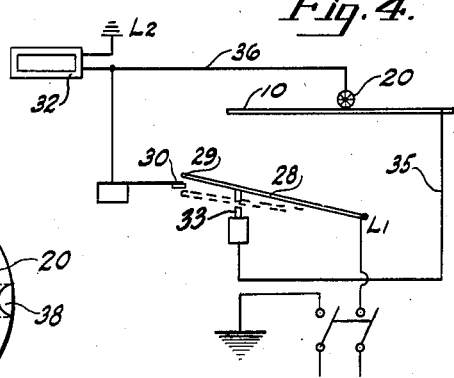
INVENTOR.
Joseph Motycka
BY
Joseph K. Schofield
ATTORNEYS.

Patented Mar. 12, 1935

1,993,892

UNITED STATES PATENT OFFICE 1,993,892

MEASURING DEVICE FOR PANTOGRAPH ENGRAVING MACHINES

Joseph Motycka, Manchester, Conn., assignor to Cheney Brothers, Manchester, Conn., a corporation of Connecticut

REISSUED

Application January 22, 1934, Serial No. 707,754

6 Claims. (Cl. 33—23)

This invention relates to engraving machines and particularly to means attached to engraving machines of the pantograph type to determine the amount of engraving produced by such a machine.

More particularly the invention relates to means for determining the number of lines and the length of lines traced over a pattern by an operator using an engraving machine to determine the effort to productive efficiency of the operator.

An object of primary importance of the present invention is to provide counters or indicators operated by movable parts of the machine during the operation of engraving a pattern, one indicator being operated each time the engraving points are moved to engraving position, and the other indicator being operated each time the stylus moves a predetermined short distance over a pattern.

A feature of importance of the invention is that a member is moved simultaneously the same distance and in the same direction as the stylus moves over the pattern being engraved and completes a contact in an electrical circuit periodically during this movement, the contact being completed each time the member moves a predetermined distance.

Another feature of importance is that the contacting member is in the form of a roller rotatable in any direction in a plane and contacting during its movement with a plate, the roller having metallic contacts in its periphery so that while rolling over the plate a circuit will be opened and closed to operate a counter or indicator.

With the above and other objects in view my invention includes the features of construction and operation set forth in the following specification and illustrated in the accompanying drawing.

In the accompanying drawing annexed hereto and forming a part of this specification, I have shown my invention embodied in a pantographic reducing engraving machine for textile printing cylinders but it will be understood that the invention can be otherwise embodied and that the drawing is not to be construed as defining or limiting the scope of the invention, the claims appended to this specification being relied upon for that purpose.

In the drawing:

Figure 1 is a complete side elevation of an engraving machine to which the present invention has been applied.

Figs. 2 and 3 are detail front and side views of the rotatable contactor, and

Fig. 4 is a wiring diagram showing the electric circuits for the indicator recording the length of movement of the contactor and that of the stylus.

In the above mentioned drawing I have shown but one embodiment of the invention which is now deemed preferable, but it is to be understood that changes and modifications may be made within the scope of the appended claims without departing from the spirit of the invention.

Briefly and in its preferred form, my invention may include the following principal parts: First, a counter or indicator preferably of the magnetic or electric type operated to indicate successive numerals with each electric impulse; second, a contactor preferably rolling with movements of the engraving stylus over a pattern and closing and opening a circuit including the indicator; third, a switch in said circuit closed when the engraving points are in operative position and open when these points are in inoperative position; and fourth, a separate counter indicating the movements of the engraving points to their operative position.

Referring more in particular to the figures of the drawing, I provide a metal plate or table 10 mounted on a bracket 11 fastened to a portion of an engraving machine base 12. The plate 10 is insulated electrically from the machine base 12 and forms a part of an electric circuit presently to be more fully described.

The form of engraving machine shown in the drawing is well-known and standard so that a detail description thereof will be unnecessary. This machine has a carriage 13 movable in one direction upon suitable ways and a second carriage 14 supported on and movable at right angles to the carriage 13. The carriage 14 may therefore be movable in any direction in a plane which is parallel to the plane of plate 10. A stylus 15 pivoted to the carriage 14 may be traced over any form of pattern mounted on a fixed table 16 supported on base 12. Movement of carriage 13 back and forth through connections not shown rotates the engraving roller 17 in opposite directions upon its axis. Movement of carriage 14 through gearing indicated in outline in Fig. 1 traverses the engraving points 18 of which but one is shown axially along the surface of the engraving roller 17. The above is the usual or standard construction and operation of engraving machines for printing rollers and enables any pattern on table 16 to be reproduced on the roller 17 in reduced dimensions determined by the various adjustments of the machine. As these parts of the machine form no part of the present invention they will not be described.

Mounted on the rear of carriage 14 so that it will rest upon and move over the metal plate 10 is a roller 20. As shown, the roller 20 is mounted for free rotation upon a horizontal axis within a supporting member 21 which may rotate about a vertical axis. As a result of this supporting means for the roller 20 the roller may adjust itself to rotate in any direction over the plate 10. The distance moved by the roller 20 will correspond to the distance moved by the stylus 15 while being traversed over a pattern being engraved. As shown in Fig. 3, the supporting member 21 for the roller 20 is offset in bracket 21a so that as the direction of motion of the carriage 14 changes, the roller 20 and supporting member 21 may swing around within its bracket 21a and rotate freely while moving in any direction.

In tracing designs by means of the stylus 15 the tracing points 18 must be moved to and from operative position in contact with the roll 17. These points 18 are therefore mounted upon an oscillating frame 19 weighted so that normally the points 18 rest upon the roll 17 with sufficient pressure to scribe lines in the lacquer covering thereon. To lift the points 18 from the roll 17 a lever 22 pivotally supported upon a fixed shaft is provided, one arm of which engages each frame 19, one only being shown in the drawing. In one position of the lever 22 the frames 19 are oscillated to disengage the points 18 from the roll 17. In the other position of the lever 22 the frames are free to oscillate by gravity to engage the points 18 with the roll 17.

A reach arm 23 extended downward along one side of the machine base 12 has its upper end attached to lever 22 and its lower end connected to a foot treadle 24. Release of the treadle 24 will therefore move the points 18 out of engagement from the roll 17 or permit them to oscillate into contact therewith when the treadle is depressed. A counterweight 25 connected to the treadle 24 normally holds the treadle in elevated position and with the points 18 disengaged from the roll. To engage the points 18 in engraving contact with the roll 17 it is necessary for the treadle 24 to be depressed by the operator.

Mounted at one side of the base 12 and pivotally attached to the reach arm 23 is a lever or arm 28. By movements of the treadle 24 during operation of the machine the lever 28 is correspondingly oscillated up and down through a small angle. Movement downward of this lever 28 engages a metal tip 29 at the outer or free end of the lever 28 with a spring clip 30 of metal adjacent thereto and supported on the side of the base 12 so that electric current may pass from the lever 28 to the clip 30 and thence through the lead 31 to the magnetic indicator 32. The lever 28 may be connected directly by the conductor $L_1$ to one terminal a source of current, the other conductor $L_2$ forming the other terminal of the source of current being grounded to the machine base. The clip 30 is insulated from the base as is also the lever 28. With each movement downward of the treadle 24 and lever 28 a circuit will be momentarily completed to operate the indicator 32 one digit. Preferably and as shown, the indicator 32 is grounded to complete the circuit back to the grounded conductor $L_2$. For any movement downward of the treadle 24 which positions the engraving points 18 for operation on roll 17 the indicator 32 will be moved one digit regardless of whether the stylus 15 is moved over the pattern. This circuit is energized to operate the indicator regardless of whether the roller 20 has one of its conductive parts in contact with the plate 10 or whether an insulated portion is in engagement with the plate 10.

Movement downward of the treadle also closes a fixed contact 33 with the lever 28 so that a circuit may be closed and opened by rotation of roller 20. This circuit extends from conductor $L_1$ through lever 28, contact 33, lead 35 to plate 10, and thence through roller 20 and lead 36 to the indicator 32. As above stated, roller 20 alternately opens and closes a contact with plate 10 each time it moves a small distance.

To effect this opening and closing of a metallic contact with the plate 10 the roller 20 may be made as shown in Figs. 2 and 3. Principally the roller is formed of formica or other durable but insulating material. Radially extending through this body portion are metal rods 38. The outer ends of these rods 38 extend to the periphery of the roller which is preferably bevelled on opposite sides. The central portion of the body portion is open and the inner ends of the rods enter this opening. Extending transversely through the center is a supporting rod 39. To assure permanent metallic contact between the inner ends of the rods 38 and the bearing 39 the space surrounding the bearing 39 may be filled with solder or other easily poured metal. By the above described construction rotation of the roller 20 alternately makes contacts by one of its rods 38 engaging the plate 10 as the roller 20 rotates over plates 10. The roller 20 is easily moved about its axis and may be rotatably supported upon anti-friction bearings to facilitate rotation, if desired. The supporting member 21 also is free to swing about its vertical axis with a minimum of friction as by means of suitable anti-friction bearings in the bracket 21a.

In addition to the indicator 32 which as above stated is preferably of the magnetic type a mechanical counter or indicator 40 may be supported on the base 12 and operated by a reach arm 41 having its lower end attached to the arm 28.

By means of the above described mechanism the number of times the engraving points 18 are moved to operative position may be indicated and the summation of the length of all lines engraved by movement of the stylus 15 over a pattern may be indicated. From these factors the total distance moved by the stylus while the points 18 are in operative position is indicated, as no movement of the indicator takes place except when the treadle is depressed. The number of times these points are moved to operative position and the average length of the lines engraved from the pattern also may be determined. From these factors the efficiency of an operator and machine may be determined. This efficiency or effort is measured entirely by movements of the members directly moved by the operator and is entirely independent of the ratio between movements of the stylus 15 and the movements of the roll 17 and points 18 for which the machine may be adjusted.

Movement downward of the lever 28 is sufficient to cause end 29 to contact with the clip 30 and pass below it, thus making a momentary contact only between parts 29 and 30. On the return or upward movement of lever 28 the end 29 strikes an insulating member 34 extending slightly beyond the end of clip 30 so that no contact with clip 30 to close the circuit to the indicator 32 takes place.

What I claim is:

1. An indicator for pantographic engraving machines comprising in combination, a pantograph carriage movable in any direction, a contactor carried thereby, a circuit opened and closed periodically during movement of said contactor with said carriage, and an indicator operated by said contactor and indicating the distance moved by said carriage.

2. An indicator for pantographic engraving machines comprising in combination, a pantograph carriage movable in any direction, engraving points controlled thereby, means to move said points into and out of operative position, and an indicator operated by movement of said carriage limited distances in any direction, said indicator being so connected to said means as to be operated only when said points are in operative position.

3. An indicator for pantographic engraving machines comprising in combination, a pantograph carriage, engraving points controlled thereby, means to move said points into and out of operative position, a contactor movable with said carriage and alternately closing and opening an electric circuit, during said movement, a switch in said circuit closed when said engraving points are in operative position, and an indictor connected in said circuit and operated with each closing of the circuit by said contactor when said switch is closed.

4. An indicator for pantographic engraving machines comprising in combination, a base, a plate thereon, a pantographic carriage supported on said base and movable in any direction in a plane, a rotatable contactor engaging said plate and movable with said carriage, an electric circuit opened and closed by said contactor during rotation of said contactor, and an indicator operated by current passing through said circuit to indicate the distance moved by said carriage.

5. An indicator for pantographic engraving machines comprising in combination, a base, a plate thereon, a pantographic carriage supported on said base and movable in any direction in a plane, a rotatable contactor engaging said plate and movable with said carriage, an electric circuit opened and closed by said contactor during rotation of said contactor, an indicator operated by current passing through said circuit to indicate the distance moved by said carriage, and means under control of the operator of said machine for rendering said indicator inoperative at times while said contactor is moving over said plate.

6. An indicator for pantographic engraving machines comprising in combination, a base, a plate thereon, a pantographic carriage supported on said base and movable in any direction in a plane, a rotatable contactor mounted on said carriage and movable therewith, said contactor rotating and moving over said plate when said carriage is operated, a plurality of points in the periphery of said contactor whereby an electric circuit is opened and closed by rotation of said contactor, and an indicator operated by opening and closing of said circuit to indicate the distance moved by said carriage.

JOSEPH MOTYCKA.